United States Patent [19]

Durham et al.

[11] Patent Number: 4,855,060

[45] Date of Patent: Aug. 8, 1989

[54] METHOD AND ADDITIVE FOR CLARIFYING AQUEOUS SYSTEMS WITHOUT PRODUCTION OF UNCONTROLLABLE FLOC

[75] Inventors: Daniel K. Durham, Spring; Urban C. Conkle, Houston; Hartley H. Downs, Kingwood, all of Tex.

[73] Assignee: Baker Hughes Incorporated, Houston, Tex.

[21] Appl. No.: 194,435

[22] Filed: May 13, 1988

[51] Int. Cl.$^4$ ................................................. C02F 1/54
[52] U.S. Cl. .................................. 210/708; 210/729; 252/344; 252/358
[58] Field of Search ............... 166/266, 267; 210/708, 210/725, 705, 727, 728, 729; 252/344, 358; 260/513.5

[56] References Cited

U.S. PATENT DOCUMENTS 4,411,814 10/1983 Burkhardt .......................... 166/267
4,569,785 2/1986 Bellos .................................. 210/708
4,689,177 8/1987 Thompson et al. ................ 252/344

*Primary Examiner*—Peter Hruskoci
*Attorney, Agent, or Firm*—Hubbard, Thurman, Turner & Tucker

[57] ABSTRACT

Method and additive are provided for clarifying an aqueous system which may contain an oil-in-water emulsion, a dispersion of a non-aqueous discontinuous phase, without production of a resultant uncontrollable floc in the system, by contacting the system with an effective water clarifying amount of a composition having present a dithiocarbamate of bishexamethylenetriamine, said dithiocarbamate having the formula:

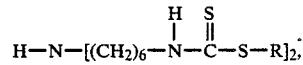

wherein: R is hydrogen, an alkali metal, an alkaline earth metal, ammonium, ion or an amine, the ratio of carbon disulfide to primary amine for said dithiocarbamate of bishexamethylenetriamine is approximately stoichiometric. The composition is maintained in the system for sufficient time to effectively clarify the system without production of an uncontrollable floc.

8 Claims, No Drawings

METHOD AND ADDITIVE FOR CLARIFYING AQUEOUS SYSTEMS WITHOUT PRODUCTION OF UNCONTROLLABLE FLOC

BACKGROUND OF THE INVENTION

1. Field of the Invention

The present invention is directed to a method and additive for the clarification of an aqueous system which may contain an oil-in-water emulsion, or a dispersion of a non-aqueous discontinuous phase, such as a production stream from a subterranean oil or gas well, such that the emulsion is effectively broken or de-emulsified, or the dispersion resolved, with the resultant aqueous stream being clarified, all without the production of an uncontrollable floc, using a composition having present a dithiocarbamate of bishexamethylenetriamine, wherein the ratio of carbon disulfide to primary amine in the bishexamethylenetriamine is approximately stoichiometric.

2. Brief Description of the Prior Art

The present invention is directed to the clarification of an aqueous system, such that the resultant stream of the aqueous system contains essentially two separate phases: an oil-, or hydrocarbon-based phase, or non-aqueous phase, and an essentially aqueous phase, with the resultant aqueous phase being clarified without production of an uncontrollable floc. Such aqueous systems may be found when producing subterranean oil and/or gas wells. The aqueous systems' may also be any aqueous system sometimes containing an oil-in-water emulsion or a non-aqueous discontinuous phase, in any other commercial or industrial environment, such as: those found in steam cylinder dispersions in which small amounts of oils which are used for lubrication purposes may be found dispersed in steam in engines and pumps; emulsions and other dispersions containing polystyrene and styrene-in-water frequently found in synthetic rubber manufacturing facilities; emulsions and other dispersions obtained during clay pipe manufacture using steam initiated processes and procedures; oil-in-water emulsions or dispersions which are found in coolant water devices and in gasoline absorption facilities; emulsions and dispersions containing wax-type products which are encountered in oil refinery dewaxing procedures; "fluxoil" emulsions and dispersions occurring in condensate steam resulting in dehydrogenation of butylene during catalytic procedures to produce butadiene; emulsions and dispersions obtained during procedures for making butadiene from naptha by means of standard "cracking" procedures in gas generators; emulsions and dispersions of latex-in-water formed in copolymerization procedures for butadiene and styrene derivatives.

Such dispersions and emulsions are also problems in synthetic resin paint and pigment manufacturing processes, as well as in food processing of derivatives of pasturized additives. In each of these processes, as well as in the equipment which is used during steps in the various procedures, oil-in-water emulsions or dispersions of a non-aqueous phase are inherently formed as a by-product of the particular given operation. The disposal of the produced waste water becomes a problem which is compounded by the presence of the oil-in-water emulsions, or dispersions containing a non-aqueous discontinuous phase.

The aqueous systems contemplated in this invention will contain water in various forms, such as tap water brines or seawater (in the case of aqueous systems involved in the drilling, completion, workover or production of subterranean oil or gas wells), and the like.

In any oil-in-water emulsion, the amount of oil in the water or aqueous phase or, in the case of the dispersion of a non-aqueous phase the amount of such non-dispersed phase, will vary, considerably, depending upon the industrial application at hand. In the case of emulsions which are frequently found in the oil field and in applications of well completion operations, the oil-in-water emulsion will contain a crude oil content varying from a few parts per million to about 20%, by volume, and even higher.

In treating such emulsified or dispersed aqueous systems for disposal or other uses or recycling, it is necessary to break the emulsified oil-in-water or resolve the dispersion such that the oil phase, or the non-aqueous dispersed phase and the water phase may be separated. The water should be clarified by the resulting demulsification treatment without production of an uncontrollable "floc". While "floc" may always be expected to be produced as a result of a water clarification treatment procedure, such "floc" should be made to be controllable, such that the treated aqueous system can pass certain industrial and/or governmental water clarity tests or specifications.

In the past, those skilled in the art have recognized the use of derivatives of certain amines as de-emulsifiers in water clarification procedures. Typical of such prior art is U.S. Pat. No. 4,689,177, which teaches the use of nitrogencontaining tridithiocarbamic acid compositions as "reverse" demulsifiers. While certain of the materials disclosed in the '177 patent may, or may not, be used satisfactorily to deemulsify certain aqueous systems, it has been found that not all such materials are satisfactory to clarify the water without production of a resultant uncontrollable "floc".

In the present invention, however, it has been found that by selection of a particular amine derivative reacted in an approximate stoichiometric ratio with carbon disulfide, a dithiocarbamate can be utilized to successfully break the emulsion and clarify the water, without the production of an uncontrollable "floc".

SUMMARY OF THE INVENTION

The present invention is directed to a method and additive for clarifying an aqueous system which may contain an oil-in-water emulsion or a dispersed non-aqueous discontinuous phase, without production of a resultant uncontrollable floc in the system. The method comprises the steps of: (1) contacting the aqueous system with an effective water clarifying amount of a composition having present therein a dithiocarbamate of bishexamethylenetriamine, having the formula:

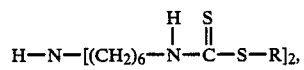

wherein: R is hydrogen, an alkali metal, an alkaline earth metal, ammonium, or an amine, the ratio of carbon disulfide to primary amine for said dithiocarbamate is approximately stoichiometric; and (2) maintaining said composition in said system for sufficient time to effectively de-emulsify the emulsion or effectively separate the dispersed on-aqueous discontinuous phase from the aqueous system and clarify the aqueous system without production of an uncontrollable floc.

As one, and a preferred, measure of determining the acceptability of the resulting clarified system, such system will have: (a) an acceptable floc as determined by a Floc Manageability Determination Method; and (b) an acceptable water quality as determined in accordance with either: (i) the gravimetric method for determination of oil and grease content in accordance with *Standard Methods for the Examination of Water and Waste Water*, 14th ed., 1975, American Public Health Association, pp. 520-521, Method No. 502e; or (ii) the spectrophotometric method, in accordance with *Methods of Chemical Analysis of Water and Waste Water*, U.S. Environmental Protection Agency, 625-Stroke 6-74-003, 1974, pp. 232-235.

DESCRIPTION OF THE PREFERRED EMBODIMENT

As used herein "aqueous system" is intended to mean and refer to any water-based stream, the major constituent of which is either tap water, fresh water, a brine, salt water, seawater, or the like, either as a natural additive during a commercial manufacturing procedure, or in the fluids which are used to drill, complete or workover a subterranean oil or gas well, in production streams of fluid hydrocarbons from subterranean wells, and the like. Also as used herein, the oil or other dispersed constituent in the oil-in-water emulsion or dispersion of a non-aqueous discontinuous phase which occurs in such aqueous systems may either be produced hydrocarbons, such as those which are found in a production well, or any hydrocarbon-, or grease-containing chemicals, sulfur, or similar constituent found in many typical manufacturing procedures, described above.

The present process contemplates contacting the aqueous system containing the oil-in-water emulsion or dispersion of the non-aqueous discontinuous phase with an effective amount of the composition as herein described. Such contact can occur in a variety of forms, such as by introduction of a "pill" or "slug" of composition through a treatment line or conduit, such as is known to those skilled in the art in the treatment of produced hydrocarbons from subterranean oil and gas wells, or by continuous injection procedures. Additionally, the composition may be added to the aqueous system prior to formation of the oil-in-water emulsion or dispersion, or may be added to the water phase which is subsequently found to contain the oil-in-water emulsion or dispersion. Typically, however, the invention will be utilized in an injection procedure wherein the composition will be continuously, or incrementally, introduced into the aqueous system containing the oil-in-water emulsion or dispersion of a non-aqueous discontinuous phase.

THe composition which includes the additive and which is used in the method may contain other additives, such as hydrogen sulfide scavengers, scale and corrosion inhibitors, anti-oxidents, demulsifiers, or the like, provided that they are, of course, chemically compatable with the composition of the present invention, and do not adversely interfere with the water clarification and floc controlling properties of the invention. Such materials may be added in relative quantities to control the secondary properties so desired.

The dithiocarbamate which is utilized in the composition of the present invention is to be made from a particular amine: bishexamethylenetriamine. Such amine may be utilized in either its pure or crude form, and is readily and commerically available from a number of suppliers, such as Monsanto, RhonePoulenc or DuPont.

The invention contemplates introduction of the composition at any desired point during the treatment of the aqueous system, such as prior to or at gravity settling equipment, flotation devices, filtration processes, sales lines, and the like. Because of obvious variations in operating parameters, such as type and quantity of oil or other hydrocarbon or other constituents comprising the dispersed non-aqueous discontinuous phase, the amount and quantity of water in the system, the clarification required for the treated aqueous system, and other physical and chemical parameters, as well as the particular dithiocarbamate selected for use, an exact level of required additive cannot be specified. Those skilled in the art will recognize that known clarification and floc evaluation tests, such as those specifically disclosed herein, may easily be used to determine the appropriate level of treatment for the particular application at hand.

It has been found that bishexamethylenetriamine will result in the formation of a more effective water clarification composition with particularly unique "floc"-controlling properties and is much more effective, in approximate stoichiometric ratios of carbon disulfide to primary amine, then compositions prepared using other amines, such as ethylamine, propylamine, butylamine, cyclohexylamine, pyridine, dibutylamine, ethylenediamine, triethylenetetramine, triethanolamine, tetraethylenepentamine, diethylenetriamine, and the like.

The dithiocarbamate of the invention has the following general formula:

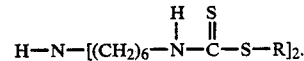

wherein: R is hydrogen, an alkali metal, an alkaline earth metal, ammonium, or an amine.

Preferably, the dithiocarbamate will be the potassium or sodium salt of dithiocarbamic acid. Other constituents, such as lithium, ammonium and amine may also be used.

While it has been found that the amine for successful application of the present invention is bishexamethylenetriamine, it has also been found that such material will not produce the desired physical properties with respect to water clarification and floc controlling characteristics if the stoichiometric ratio of carbon disulfide to primary amine is not in approximately stoichiometric equivalency. Although exact equivalent ratios are not necessarily critical, in any case, the ratio should approach an approximate stoichiometric balance, which for non-pure grades of the amine, will typically be from between approximately about 0.85 to approximately about 1.03 equivalents of $CS_2$ to 1 equivalent of primary amine. The particular carbon disulfide/primary amine ratio will be expected to vary depending, of course, upon the particular source of crude amine, the aqueous system at hand, the physical and chemical characteristics of the oil-in-water emulsion or the dispersion of the non-aqueous discontinuous phase, and other physical parameters of the environment within which the water clarification is to be affected. However, with only minor testing, one skilled in the art can easily determined the approximate stoichiometric ratio between the carbon disulfide and the amine to maximize effective treatment. To prepare a dithiocarbamate with a desired ratio of carbon disulfide to primary amine, the carbon disulfide/primary amine ratio is determined by first determining the primary amine content of the bishexamethylenetriamine used by titration procedures with a normalized strong acid solution. The following calculation is used to determine the ratio:

$$\text{CS}_2 \text{ equivalents per equivalents of primary amine} = \frac{\text{gms. CS}_2/76}{(\text{gms. Amine}) \times (\text{Eqv. 1° N/gm.})}$$

The present invention contemplates maintaining the composition with the dithiocarbamate in the aqueous system for sufficient time to effectively clarify the system and to control the resultant floc which occurs as a result of the clarification procedure. Of course, the water quantity and quality, the tightness and content of the oil-in-water emulsion or the dispersion of the non-aqueous discontinuous phase and other chemical and physical variables will dictate the amount of time which is required to effectively clarify the water for the particular end use application or disposal technique at hand. Those skilled in the art may utilize simple water clarification and floc tests, described below, to determine, among other things, the amount of time which is required to maintain the composition in the system for effective water clarification purposes.

"Floc" is considered to be a by-product of water clarification which may vary in characteristics depending upon the composition of the clarifier used to clarify the water. Such floc can generally be described as a loose, black, powdery, oil wet particulate, or agglomerated, may adversely effect operations of clarification systems by means of adherence, plugging and interface problems with manufacturing equipment or production equipment. Floc characteristics can be visually judged by observing a sample of the treated aqueous system. The present invention contemplates water clarification such that the floc which is formed does not cause operational problems in the treatment system by means of adherence, plugging, or interface buildup with equipment being exposed to the aqueous system.

In determining the ability of a composition including the additive of the present invention to clarify an aqueous system and produce a controllable resultant floc, the aqueous system with the composition added thereto is simulated. Water quality is then determined using gravimetric, spectrophotometric, or visual means. A floc rating then is established using techniques described below.

In the examples below, the formation of an acceptable or unacceptable floc was determined during a simple bottle test and by bench scale flotation procedures. If the floc was deemed by visual appearance not to be controllable, a floc rating of "U" was given. On the other hand, a floc which was deemed to be acceptable and controllable was given a floc rating of "A".

The presence of an unmanageable floc is easily determinable by visual observation during bench testing procedures. During such tests, any floc which appears is visually rated against an "acceptable" an known base sample which has been treated with a material to clarify the water without production of an unmanageable floc. The following rankings are then applied to the particular sample:

Acceptable: loose, brown, water wet floc.
Acceptable: agglomerated, brown, water wet floc.
Unacceptable: loose, black, powdery, oil wet floc.
Unacceptable: agglomerated, black, powdery, oil wet floc.
Unacceptable: agglomerated, black, ropy, oil wet floc.
Unacceptable: agglomerated, block, plastic, oil wet floc.

An acceptable floc does not cause operational problems in the system via adherence, plugging, and interface buildup. An unacceptable floc formation causes operational problems in the system by means of adherence, plugging and interface problems. This described testing procedure is referred to as the Floc Manageability Determination Method.

In the working examples, set forth below, an acceptable/unacceptable water clarification rating was determined by both a simple bottle test and by a bench scale flotation testing procedure. The bottle test is a method in which samples of a selected fluid are treated with varying levels of chemicals to be evaluated and agitated in a manner simulating conditions in a given aqueous system. After settling for a designated period, the performance of the chemicals is observed. Samples of the treated system may be further analyzed for oil-in-water content by extraction of the aqueous phase with a fluorocarbon, such as 1,1,2-trichloro-1,2, 2-trifluoroethane, and hydrocarbon content determined by gravimetric or spectrophotometric procedures.

In evaluating compositions for their ability to clarify a given aqueous system, care should be exercised to ensure that the sample used for testing is representative of the aqueous system to be treated. The sample point selected should be at a location where the fluid is preferably a composite of the fluids being treated in the system, and is at a point in close proximity to where the chemical is likely to be applied. Preferably, a sample tap should be located at the bottom of a pipe or conduit to allow sampling of the water external phase. In obtaining the sample, the sample valve should be open to an extent to minimize shearing of the emulsion or interference with the dispersion of the non-aqueous discontinuous phase. Before any testing is carried out, the emulsion or dispersion to be tested should be verified as having an aqueous continuous phase in a known manner. Using a syringe, samples of the aqueous system are injected with varying treatment levels of the treatment composition. The sample containers are capped and agitated by either hand shaking or use of a mechanical oscillating shaker. After agitation, the fluids are allowed to settle for a duration and under conditions which have been determined to correlate with the system conditions. At the end of the settling period, evaluations of the performance of each sampled material are made by visual appearance, using the following criteria:

E = Excellent: Water is cleaned with distinct sparkle and no visible suspended particles.
G = Good: Water has light haze (white) and/or carries light amounts of suspended material.
F = Fair: Water has distinct coloration, either as a haze or from the presence of suspended particles.
P = Poor: Treatment has had an effect, but water remains very turbid and/or colored.
B = Bad: No effective treatment, equal to untreated sample. Intermediate Rating: (+) = better than; (−) = poor than.

The given sample of the aqueous system containing the treating composition is tested, as above, and thereafter, oil and grease are separated from the water (if any such oil and grease is apparent) by known chemical means, and the concentration of such material determined. Of course, the less oil and grease in the sample, the more satisfactory water clarification. In the working examples and in the claims, water clarifying performance is expressed as residual concentration of oil and grease.

While specific concentration ranges for oil and grease content cannot be given for satisfactory water clarification for all aqueous systems because of varying chemical and physical characteristics of the particular aqueous systems, the ppm. levels can easily be determined using Method 502e, *Standard Methods for Examination of Water and Waste Water*, 14th Ed., 1975, American Public Health Association, pp. 520–521 (gravimetric method for parts per million oil and grease); or *Methods of Chemical Analysis of Water and Waste Water*, U.S. Environmental Protection Agency 625-Stroke 6-74-003, 1974, (spectrophotometric method). Each of these procedures are hereby incorporated herein by reference.

Water clarification performance may also be determined in the test set forth below by means of a flotation test procedure. This procedure simulates the performance of the compositions evaluated in treatment systems utilizing flotation devices for the clarification.

Dispersed gas and air flotation procedures have become accepted and increasingly popular processes for the treatment of effluent waters in the oil field. Among the types of equipment being used in this process include processes using the Wemco Depurator ®, of the Envirotech Division of Baker Hughes Incorporated. This piece of equipment facilitates removal of suspended solids and oil from water by generating and dispersing throughout the water finely divided gas or air bubbles. These bubbles interact with contaminant particles, increasing their buoyancy and causing them to be floated to the surface where they are removed. With use of the Wemco Depurator ®, the bubble generation and dispersion is accomplished by rotor/stator mechanisms. Chemical aids are frequently required in conjunction with the use of this type of equipment. Such aids act to destabilize the oil or solids in the water, to coagulate or agglomerate the de-stabilized particles, to provide for interaction of the de-stabilized contaminates with the dispersed bubbles to accomplish the lift of the contaminants, and to form a froth to keep the floated material in a stable position until it is removed by skimming. A bench test procedure simulating this process has been utilized in the working examples to test the prepared samples for water clarification and floc characteristics. Representative samples of the water to be clarified are obtained and treated by means of use of a bench scale flotation cell simulator. Individual tests are conducted in the absence of any treatment chemical and repeated sequentially utilizing different chemicals and dosage levels until a satisfactory response is obtained. The tests are conducted utilizing a specific set of simulator operating parameters. First, a fresh sample of water is obtained. Prior to filling the bowl of the test device, a micro liter syringe is filled to the appropriate level with the composition to be evaluated. The water sample is agitated to ensure its homogenity and the bowl of the test device is filled. With the air/gas valve closed, the simulator is started and the chemical composition is injected into the water. Agitation is continued for, generally speaking, approximately 15 seconds. The air intake valve is opened and the cell is run for, preferably, and additional 1-1/2 minutes but can be run from about 1 to about 10 minutes. At the end of the conclusion of the flotation period with the unit continuing to run, a sample is obtained of the treated water in a suitable sample bottle. During and at the conclusion of the tests, several observations are made and recorded. The water clarity at the end of the test is qualitatively rated by the following system:

E=Excellent: Water is cleaned with distinct sparkle and no visible suspended particles.

G=Good: Water has light haze (white) and/or carries slight amounts of suspended material.

F=Fair: Water has distinct coloration, either as a haze or from the presence of suspended particles.

P=Poor: Treatment has had an effect, but water remains very turbid and/or colored.

B=Bad: No treatment, equal to untreated material.

Intermediate ratings between the above are indicated by either a plug ("better than") or a minus ("poorer than"). Additionally, the oil-in-water content of the treated water can be determined by standard procedures using extraction with a suitable solvent with gravimetric or spectrophotometric gravitation.

Numerous procedures well known to those skilled in the art may be utilized to make a dithiocarbamate derived from bishexamethylenetriamine. For laboratory purposes, a 500 ml. flask equipped with a magnetic stirrer, thermometer, dropping funnel and reflux condenser attached to a caustic scrubber may be utilized into which is placed 13.52 weight percent of 50% sodium hydroxide, 46.48 weight percent water, 24.16 weight percent bishexamethylene triamine, 15,84 weight percent carbon disulfide. The mixture (without carbon disulfide) is cooled externally in an ice bath to approximately 10° to 15° C., and then the carbon disulfide is added over a period of about 10 minutes with vigorous agitation while maintaining the reaction temperature below 15° C. After an additional 10 minutes at about 15° C., the ice bath may be removed and the reaction mixture allowed to warm up to room temperature with stirring continued for about 1 hour. Before transferring the final product, the reactor is purged with nitrogen/air to remove any residual carbon disulfide or hydrogen sulfide which may have ben produced during the preparation. The resulting product will be the sodium salt of the dithiocarbamic acid of bishexamethylenetriamine, or sodium dithiocarbamate.

In the examples set forth below a test product was prepared and identified as 461-9-4. This material was made from crude bishexamethylenetriamine as the amine, commercially available from Monsanto. The material contained 24.16 weight percent amine with 15.84 weight percent $CS_2$, 13.52 percent by weight sodium hydroxide, and 46.48 percent by weight water. The ratio of primary amine to carbon disulfide was approximately stoichiometric and was found to be 1.02.

EXAMPLE I

Tests were performed and results were evaluated in order to evaluate the treatment composition of the present invention, as represented by produce 461-9-4, varying the carbondisulfide/primary amine ratio. Floc rating and water clarity tests were conducted, as described above. The results of these tests clearly indicate that ratios above and below the approximate stoichiometric ratio of carbon disulfide to primary amine failed to produce a composition which satisfactorily clarified the water, and yet produced only a floc which was deemed to be acceptable or managable. The results are set forth in the table, below.

TABLE I

| Product | Monsanto Crude BHMT | Wt % CS$_2$/ | Wt. % NaOH | Wt. % H$_2$O | CS$_2$/ 1° N | Floc Rating Bottle/ Visual | Floc Rating Flotation Test | Water Clarity Bottle/ Visual | Water Clarity Flotation Test* |
|---|---|---|---|---|---|---|---|---|---|
| H-115 | 34.88 | 7.77 | 6.56 | 50.79 | .35 | A | A | F-- | 14.6 |
| H-116 | 31.40 | 9.95 | 8.43 | 50.22 | .50 | A | A | F-- | 14.6 |
| H-117 | 29.24 | 12.04 | 10.19 | 48.53 | .65 | A | A | F-- | 9.0 |
| H-118 | 27.74 | 13.17 | 11.15 | 47.94 | .75 | A | A | F+ | 7.2 |
| H-119 | 26.37 | 14.20 | 12.04 | 47.38 | .85 | A | A | G+ | 4.0 |
| H-120 | 24.57 | 15.56 | 13.19 | 46.68 | 1.00 | A | A | E- | 1.0 |
| 461-9-4 | 24.16 | 15.84 | 13.52 | 46.48 | 1.02 | A | A | E+ | 0 |
| H-121 | 23.25 | 16.56 | 14.04 | 46.15 | 1.07 | U | U | E+ | 0 |
| H-122 | 21.82 | 17.62 | 14.97 | 45.59 | 1.21 | U | U | E+ | 0 |
| H-123 | 20.01 | 19.01 | 16.14 | 44.84 | 1.43 | U | U | E+ | 0 |
| H-124 | 16.86 | 21.37 | 18.17 | 43.60 | 1.90 | U | U | E- | 0 |

*mg./l oil in water

EXAMPLE II

Tests were performed, and results were evaluated, as in Example I, comparing product 461-9-4 with a material made in accordance with U.W. Pat. No. 4,689,177, and identified as product HD-58-1. The test also compared these two materials against other samples (H-181 through H-190) using a crude bishexamethylenetriamine commercially available from the RhonePoulenc Co. In the testing, the Rhone-Poulenc crude bishexamethylenetriamine carbon disulfide/primary amine ratio was carried, as indicated. Again, the results of this test indicated that this crude bishexamethylenetriamine derived material provided satisfactory water clarification and manageable floc material when the stoichiometry was within the parameters of this invention. Additionally, this test shows that the sample made in accordance with U.S. Pat. No. 4,689,177, even though prepared in a comparable stoichiometric ratio of carbon disulfide/primary amine, clarified the water, but did so with a resulting unacceptable floc production. The results of this test are set forth in Table II below.

TABLE II

| Product | Wt. % Rhone-Poulenc BHMT | Wt. % CS$_2$ | Wt. % 50% NaOH | Wt. % H$_2$O | CS$_2$/ 1° N | Floc Rating Bottle/ Visual | Floc Rating Flotation Test | Water Clarity Bottle/ Visual | Water Clarity Flotation Test* |
|---|---|---|---|---|---|---|---|---|---|
| H-181 | 14.43 | 4.92 | 4.18 | 76.47 | .35 | A | A | P | 115.0 |
| H-182 | 12.85 | 6.26 | 5.33 | 75.56 | .50 | A | A | P+ | 54.0 |
| H-183 | 11.59 | 7.34 | 6.24 | 74.83 | .65 | A | A | F- | 39.0 |
| H-184 | 10.86 | 7.54 | 6.74 | 74.46 | .75 | A | A | G | 12.0 |
| H-185 | 10.23 | 8.47 | 7.19 | 74.11 | .85 | A | A | E- | 9.0 |
| H-186 | 9.06 | 8.83 | 8.98 | 73.13 | 1.0 | U | U | E- | 8.0 |
| H-187 | 8.52 | 9.33 | 9.32 | 72.83 | 1.15 | U | U | E- | 8.0 |
| H-188 | 7.94 | 9.86 | 9.68 | 72.52 | 1.31 | U | U | E- | 8.0 |
| H-189 | 7.20 | 10.53 | 10.13 | 72.14 | 1.54 | U | U | F++ | 12.0 |
| H-190 | 5.97 | 11.64 | 10.87 | 71.52 | 2.05 | U | U | F- | 14.0 |
| 461-9-4 | — | — | — | — | 1.02 | A | A | E- | 7.2 |
| HD-58-1 | — | — | — | — | 1.00 | U | U | E- | 14.4 |

*mg./l oil in water

EXAMPLE III

Tests were run and results were evaluated in order to determine the effectiveness of compositions incorporating a crude bishexamethylenetriamine commercially available from the DuPont company as the amine. The carbon disulfide/primary amine ratio was varied, as indicated. The samples were also compared for floc rating and water clarification effectiveness with product 461-9-4 and HD-58-1, as in Examples I and II. The results of this test clearly indicated that this alternate crude bishexamethylenetriamine material produced a satisfactory water clarification composition having satisfactory floc ratings when the carbon/disulfide primary amine ratio is with the stoichiometric ranges of the invention. The results are set forth in the table below.

TABLE III

| Product | Wt. % DuPont Crude BHMT | Wt. % CS$_2$ | Wt. % 50% NaOH | Wt. % H$_2$O | CS$_2$/ 1° N | Floc Rating Bottle/ Visual | Floc Rating Flotation Test | Water Clarity Bottle/ Visual | Water Clarity Flotation Test* |
|---|---|---|---|---|---|---|---|---|---|
| H-171 | 31.40 | 7.74 | 6.58 | 54.28 | .35 | A | A | P | 110 |
| H-172 | 28.62 | 10.66 | 8.54 | 52.78 | .50 | A | A | P+ | 53 |
| H-173 | 26.32 | 12.03 | 10.23 | 51.42 | .65 | A | A | F- | 23.4 |
| H-174 | 24.95 | 13.16 | 11.19 | 50.70 | .75 | A | A | G++ | 17.0 |
| H-175 | 23.72 | 14.19 | 12.06 | 50.03 | .85 | A | A | E- | 9.0 |
| H-176 | 22.12 | 15.57 | 13.21 | 49.10 | 1.0 | U | U | E- | 8.0 |
| H-177 | 20.91 | 16.55 | 44.04 | 48.50 | 1.15 | U | U | E- | 8.0 |
| H-178 | 19.67 | 17.66 | 14.97 | 47.70 | 1.31 | U | U | E- | 8.0 |
| H-179 | 18.02 | 19.03 | 16.12 | 46.83 | 1.54 | U | U | G++ | 8.0 |
| H-180 | 15.20 | 21.41 | 18.13 | 45.26 | 2.05 | U | U | G+ | 8.0 |
| 461-9-4 | — | — | — | — | 1.02 | A | A | E- | 7.2 |

TABLE III-continued

| Product | Wt. % DuPont Crude BHMT | Wt. % CS$_2$ | Wt. % 50% NaOH | Wt. % H$_2$O | CS$_2$/ 1° N | Floc Rating Bottle/ Visual | Floc Rating Flotation Test | Water Clarity Bottle/ Visual | Water Clarity Flotation Test* |
|---|---|---|---|---|---|---|---|---|---|
| HD-58-1 | — | — | — | — | 1.0 | U | U | E— | 14.4 |

*mg./l oil in water

EXAMPLE IV

Tests were performed and results were evaluated to determine the effectiveness of various samples using 98% technical grade bishexamethylenetriamine as the amine. The samples were compared against product 461-9-4 and HD-58-1, as in previous examples. The carbon disulfide/primary amine ratio was varied, as in previous examples. Because a pure technical grade material was used as opposed to a crude material, the percent by weight of carbon disulfide was evaluated as well as the mole ratio of carbon disulfide to primary amine. In this test, again, it was clearly found that products obtained outside of the stoichiometric range of this invention failed to produce a water clarification composition having a satisfactory floc rating. On the other hand, however, a product within the stoichiometric range of the present invention, product H-202, was satisfactory. The results are set forth in Table IV, below.

TABLE IV

| Product | Wt. % BHMT | Wt. % CS$_2$ (mole ratio CS$_2$/BHMT) | Wt. % 50% NaOH | Wt. % H$_2$O | CS$_2$/ 1° N | Floc Rating Bottle/ Visual | Floc Rating Flotation Test | Water Clarity Bottle/ Visual | Water Clarity Flotation Test* |
|---|---|---|---|---|---|---|---|---|---|
| H-200 | 26.24 | 12.07 (1.3) | 10.28 | 51.41 | .65 | A | A | P | 110 |
| H-201 | 23.63 | 14.27 (1.7) | 12.12 | 49.98 | .85 | A | A | F— — | 53 |
| H-202 | 22.10 | 15.61 (2.0) | 13.18 | 49.11 | 1.00 | A | A | E— — | 17 |
| H-203 | 19.59 | 17.65 (2.5) | 15.01 | 47.75 | 1.31 | U | U | E— | 12 |
| H-204 | 18.02 | 19.10 (3.0) | 15.95 | 46.93 | 1.54 | U | U | E— | 7.2 |
| 461-9-4 | — | — | — | — | 1.00 | A | A | E— | 7.2 |
| HD-58-1 | — | — | — | — | 1.00 | U | U | E— | 14.4 |

*mg./l oil in water

EXAMPLE V

Tests were conducted and results were evaluated to determine the effectiveness of products 461-9-4 and HD-58-1 when compared against sample materials, product H-135 through H-141, prepared using hexamethylenediamine a the amine. Again, the carbon disulfide/primary amine ratios were varied. In this test, when an amine other than bishexamethylenetriamine is utilized, even in a stoichiometric ratio of carbon disulfide/primary amine, an unsatisfactory product is obtained. The results are set forth in Table V, below;

TABLE V

| Product | Wt. % HMDA | Wt. % CS$_2$ | 50% NaOH | Wt. % H$_2$O | CS$_2$/ 1° N | Floc Rating Bottle/ Visual | Floc Rating Flotation Test | Water Clarity Bottle/ Visual | Water Clarity Flotation Test* |
|---|---|---|---|---|---|---|---|---|---|
| H-135 | 12.54 | 5.75 | 6.74 | 74.97 | .35 | A | A | P++ | 20.0 |
| H-136 | 10.90 | 7.14 | 7.88 | 74.08 | .50 | A | A | P++ | 15.0 |
| H-137 | 9.15 | 7.80 | 10.38 | 72.67 | .65 | U | U | F+ | 2.0 |
| H-138 | 8.56 | 8.41 | 10.65 | 72.38 | .75 | U | U | F+ | 1.0 |
| H-139 | 8.02 | 8.94 | 10.89 | 72.15 | .85 | U | U | F+ | 0 |
| H-140 | 6.73 | 8.81 | 13.69 | 70.77 | 1.00 | U | U | F++ | 0 |
| H-141 | 5.34 | 10.50 | 13.88 | 70.28 | 1.50 | U | U | F— — | 0 |
| 461-9-4 | — | — | — | — | 1.02 | A | A | E+ | 1.0 |
| HD-58-1 | — | — | — | — | 1.00 | U | U | E+ | 0 |

*mg./l oil in water

EXAMPLE VI

Tests were performed and results were evaluated comparing product 461-9-4 and product HD-58-1 against products H-125 through H-134, which incorporated a dithiocarbamate using diethylene triamine as the source of the amine. The carbon disulfide/primary amine ratio was varied. The results of this test again showed that even within the approximate stoichiometric ratio of the present invention, the materials failed to produce a satisfactory water clarification composition which also had a satisfactory floc rating, thus further indicating that selection of the particular amine is important to providing a satisfactory product. The results of this test are set forth in the table below:

TABLE VI

| Product | Wt. % Monsanto DETA | Wt. % CS$_2$ | Wt. % 50% NaOH | Wt. % H$_2$O | CS$_2$/ 1° N | Floc Rating Bottle/ Visual | Floc Rating Flotation Test | Water Clarity Bottle/ Visual | Water Clarity Flotation Test* |
|---|---|---|---|---|---|---|---|---|---|
| H-125 | 25.19 | 12.96 | 11.00 | 50.85 | .35 | A | A | F-- | 28.0 |
| H-126 | 21.62 | 15.96 | 13.56 | 48.86 | .50 | A | A | F-- | 28.0 |
| H-127 | 18.97 | 18.20 | 15.47 | 47.36 | .65 | A | A | F-- | 28.0 |
| H-128 | 17.53 | 19.41 | 16.50 | 46.56 | .75 | A | A | F-- | 28.0 |
| H-129 | 16.29 | 20.44 | 17.38 | 45.89 | .85 | A | A | F-- | 28.0 |
| H-130 | 14.73 | 21.75 | 18.44 | 45.03 | 1.0 | A | A | F-- | 14.0 |
| H-131 | 13.57 | 22.74 | 19.33 | 44.33 | 1.15 | A | A | F-- | 11.0 |
| H-132 | 12.46 | 23.68 | 20.13 | 43.73 | 1.31 | A | A | F-- | 10.0 |
| H-133 | 11.10 | 24.81 | 21.09 | 43.00 | 1.54 | A | A | F+ | 11.0 |
| H-134 | 9.00 | 26.63 | 22.52 | 41.85 | 2.05 | A | A | F++ | 13.0 |
| 461-9-4 | — | — | — | — | 1.02 | A | A | E+ | 1.0 |
| H-58-1 | — | — | — | — | 1.0 | A | A | E+ | 0 |

*mg./l oil in water

EXAMPLE VII

Tests were run as in the previous examples comparing product 461-9-4 of the present invention and product HD-58-1, as represented in prior art, in comparison with products H-156 through H-162, which were made using 1,2-diaminocyclohexane, as the amine. Again, the carbon disulfide/primary amine ratios were varied. The results of this test clearly indicated that, even at the stoichiometric ratios of the invention, a water clarification product with successful floc rating characteristics was unobtained when the amine was not that of the invention. The results are set forth in Table VII below:

TABLE VII

| Product | Wt. % DuPont 1,2 DACH | Wt. % CS$_2$ | Wt. % 50% NaOH | Wt. % H$_2$O | CS$_2$/ 1° N | Floc Rating Bottle/ Visual | Floc Rating Flotation Test | Water Clarity Bottle/ Visual | Water Clarity Flotation Test* |
|---|---|---|---|---|---|---|---|---|---|
| H-156 | 24.89 | 11.52 | 13.37 | 50.22 | .35 | A | A | F-- | 27 |
| H-157 | 21.73 | 15.84 | 15.84 | 48.08 | .50 | A | A | F-- | 27 |
| H-158 | 20.10 | 17.26 | 17.26 | 14.68 | .65 | U | U | F+ | 21 |
| H-159 | 17.73 | 17.58 | 18.88 | 45.81 | .75 | U | U | F++ | 19 |
| H-160 | 16.58 | 18.65 | 19.57 | 45.20 | .85 | U | U | G- | 24 |
| H-161 | 15.20 | 20.09 | 20.03 | 44.68 | 1.00 | U | U | G | 30 |
| H-162 | 11.70 | 23.18 | 22.46 | 42.66 | 1.50 | U | U | F- | 40 |
| 461-9-4 | — | — | — | — | 1.02 | A | A | E+ | 1 |
| HD-58-1 | — | — | — | — | 1.0 | U | U | E+ | 0 |

*mg./l oil in water

EXAMPLE VIII

Emulsified aqueous systems were sampled from various offshore production well locations using, at various concentrations, product HD-58-1 (of the prior art) and product 461-9-4 (within the scope of this invention, as described in Example I). Bottle tests were utilized to obtain floc ratings and water quality. In these tests, water quality was observed by a visually. Results of this test indicate that the product of the present invention will produce a satisfactory water clarification composition in which the water clarification quality is acceptable, and the floc rating also is acceptable. In contrast, samples which were treated with compositions outside the scope of the present claims were unacceptable, either from a water clarification vantage point, or from a floc production observation. The results are set forth in Table VIII, below:

TABLE VIII

| Product | Conc. | Location | Floc Rating | Water Quality (Visual) |
|---|---|---|---|---|
| HD-58-1 | 80 | Offshore Gulf of Mexico-1 | U | P |
| " | 120 | " | U | P |
| 461-9-4 | 80 | " | A | G+ |
| " | 120 | " | A | G+ |
| HD-58-1 | 80 | " | U | P |
| " | 120 | " | U | P |
| HD58-1 | 20 | Offshore Gulf of Mexico-2 | U | P |
| HD-58-1 | 20 | " | U | P |
| 461-9-4 | 20 | " | A | F+ |
| 461-9-4 | 30 | Offshore Gulf of Mexico-3 | A | F- |
| HD-58-1 | 30 | " | U | P |
| 461-9-4 | 80 | Offshore Gulf of Mexico-4 | A | F+ |
| HD-58-1 | 80 | " | U | P+ |
| 461-9-4 | 50 | Offshore Gulf of Mexico-5 | A | G- |
| 461-9-4 | 80 | " | A | G+ |
| 461-9-4 | 120 | " | A | G+ |
| HD-58-1 | 50 | " | U | P+ |
| HD-58-1 | 80 | " | U | P+ |
| HD-58-1 | 120 | " | U | F-- |

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A method of clarifying an aqueous system containing an oil-in-water emulsion or a dispersion of a non-aqueous discontinuous phase with production of only a controllable floc in the system, comprising the steps of: (1) contacting the system with an effective water clarifying amount of a composition having present therein a dithiocarbamate of bishexamethylenetriamine, said dithiocarbamate being formed from an approximately stoichiometric ratio of carbon disulfide to primary amine in said bishexamethylenetriamine; (2) maintaining said composition in said system for sufficient time to effectively clarify the system with production of only a controllable floc; and (3) removing said floc from said aqueous system.

2. The method of claim 1 wherein said dithiocarbamate is sodium dithiocarbamate.

3. The method of claim 1 wherein said dithiocarbamate is potassium dithiocarbamate.

4. The method of claim 1 wherein said dithiocarbamate is lithium dithiocarbamate.

5. The method claim 1 wherein said dithiocarbamate is provided in an alkali metal thereof.

6. The method of claim 1 wherein said dithiocarbamate is provided in an alkaline earth metal thereof.

7. The method of claim 1 wherein said dithiocarbamate is ammonium dithiocarbamate.

8. The method of claim 1 wherein said dithiocarbamate includes an amine.

* * * * *